No. 753,243. PATENTED MAR. 1, 1904.
G. DETTMAR.
VELOCITY METER.
APPLICATION FILED SEPT. 12, 1902.
NO MODEL. 5 SHEETS—SHEET 1.

Witnesses
E. Harrener
John Gillman Jr.

Inventor
George Dettmar
by
Foster Freeman
Attorneys

No. 753,243. PATENTED MAR. 1, 1904.
G. DETTMAR.
VELOCITY METER.
APPLICATION FILED SEPT. 12, 1902.
NO MODEL. 5 SHEETS—SHEET 3.

Witnesses
E. Warrener
[signature]

Inventor
George Dettmar
by [signature]
Attorneys

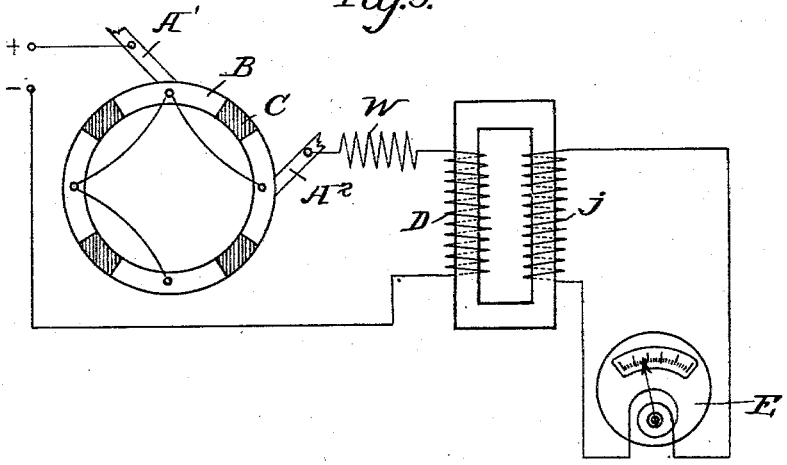
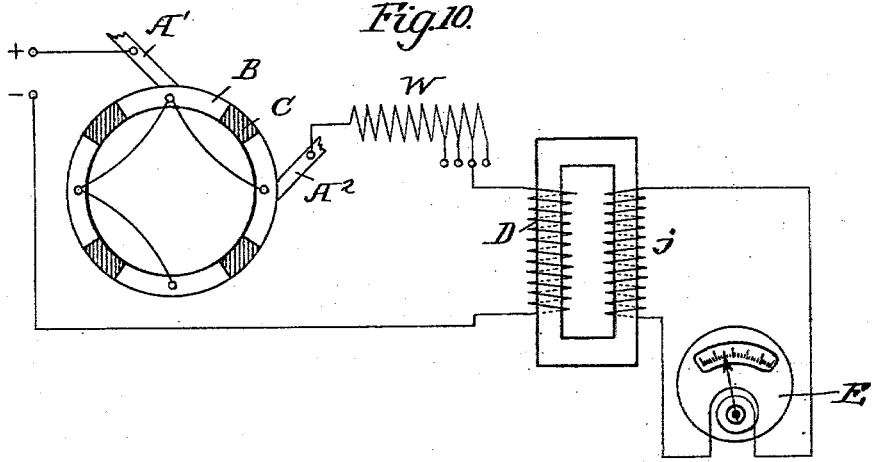

No. 753,243.

Patented March 1, 1904.

UNITED STATES PATENT OFFICE.

GEORG DETTMAR, OF FRANKFORT-ON-THE-MAIN, GERMANY, ASSIGNOR TO SOCIETY OF ELECTRICITÄTS ACTIEN-GESELLSCHAFT VORM. W. LAHMEYER & CO., OF FRANKFORT-ON-THE-MAIN, GERMANY.

VELOCITY-METER.

SPECIFICATION forming part of Letters Patent No. 753,243, dated March 1, 1904.

Application filed September 12, 1902. Serial No. 123,140. (No model.)

*To all whom it may concern:*

Be it known that I, GEORG DETTMAR, a subject of the German Emperor, residing and having my post-office address at 45 Höchsterstrasse, Frankfort-on-the-Main, Germany, have invented certain new and useful Improvements in Velocity-Meters, of which the following is a specification.

If the circuit of a source of direct electric current, including a self-induction bobbin, be closed, the current on account of the self-induction attains but gradually the strength required by Ohm's law and the current does not cease suddenly when the circuit is broken, but reaches its zero value gradually. If the making and breaking of the circuit takes place periodically in quick succession, the bobbin will take less current, the amount of current depending upon the frequency of the breaks and consequent intensity which the current has attained at the time of the break. If an instrument is connected to a circuit for measuring the current passing through the bobbin, it is possible to determine easily the frequency of the breaks by reading the intensity of the current as recorded by the said instrument.

If it is desired to measure the velocity of any body in motion, it is only necessary to connect it in any suitable manner with a switch or interrupter arranged to make and break a circuit of the hereinbefore-described nature. From the current traversing the bobbin, which current may be measured by the aforesaid measuring instrument duly standardized, it is possible to ascertain the frequency of the breaks, and consequently of the velocity, of the body.

Figure 1:
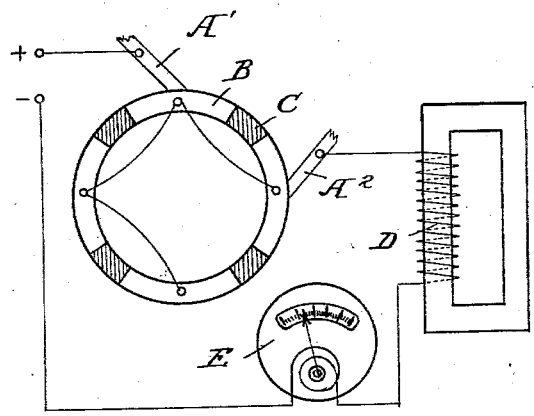
Figure 2:
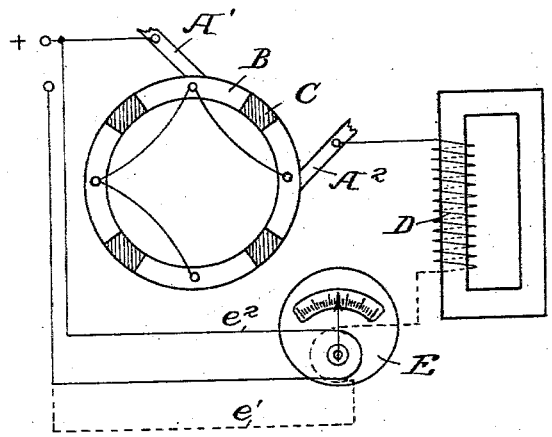
Figure 3:
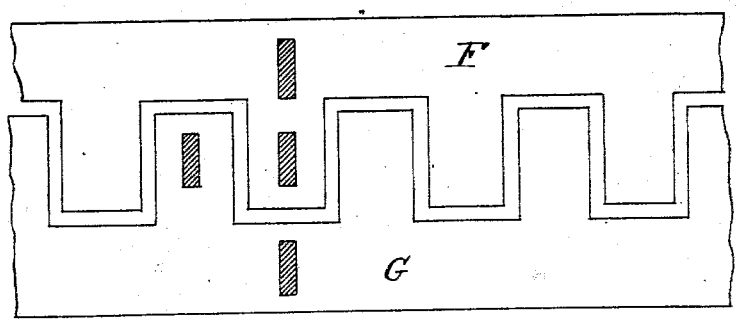
Figure 4:
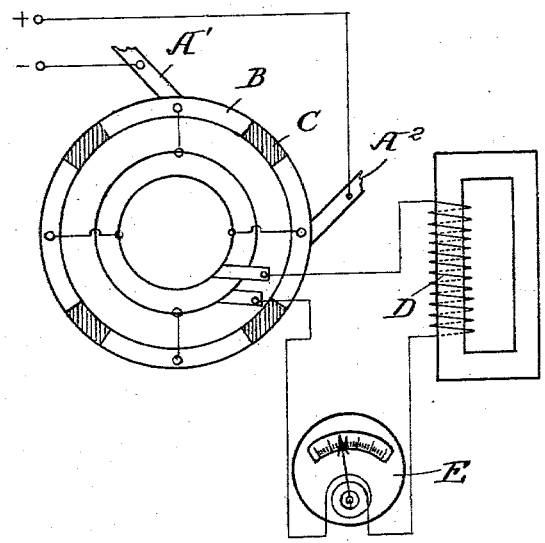
Figure 5:
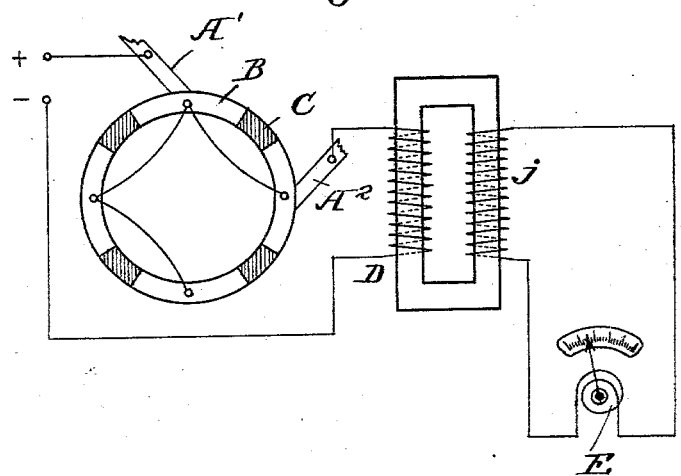
Figure 6:
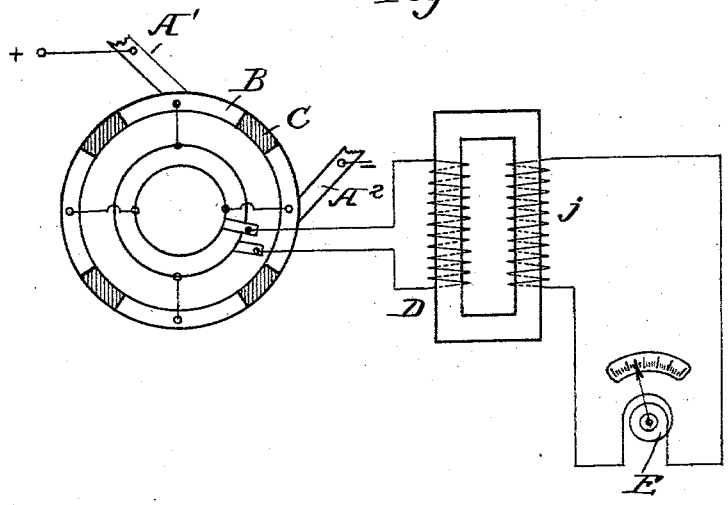
Figure 7:
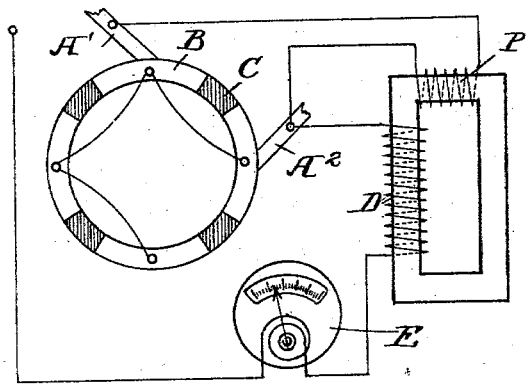
Figure 8:
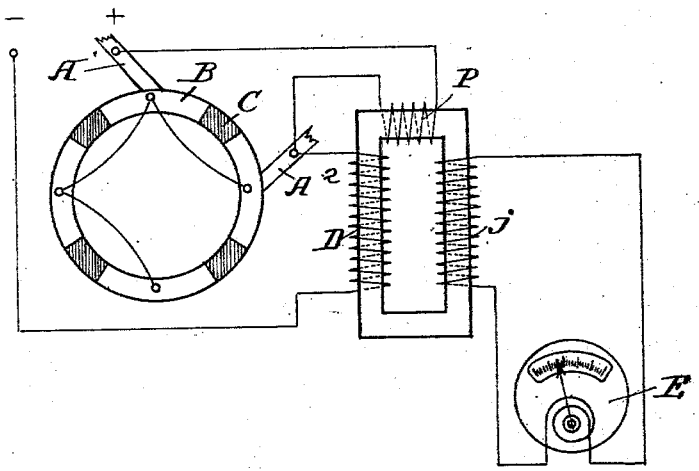

In the accompanying drawings, Figure 1 is an interrupter or switch connected to a self-induction coil and to a measuring instrument; Fig. 2, a second arrangement in which is used an electromagnetic measuring instrument with two differential windings; Fig. 3, a modified interrupter or switch used as a reverser; Fig. 4, a reverser connected to a self-induction coil and to a measuring instrument; Fig. 5, a particular arrangement of the interrupter or switch shown in Fig. 1, connected to two self-induction coils and to a measuring instrument; Fig. 6, the same arrangement in which is used the reverser shown in Fig. 3; Fig. 7, an interrupter or switch connected to a self-induction coil, to a resistance-coil, and to a measuring instrument; Fig. 8, the same arrangement in which are used two self-induction coils; Fig. 9, an interrupter or switch in connection with a rheostat, two self-induction coils, and to a measuring instrument; Fig. 10, the same arrangement in which is used a compensating resistance.

The said interrupter or switch consists of conducting-segments B, separated from each other by non-conducting segments C, and is connected by brushes $A'$ $A^2$ to the circuit. One of the brushes $A^2$ leads the current to self-induction coil D, through which it goes to the measuring instrument E and thence to the negative pole of the source of electricity.

The hereinbefore-described principle, which affords a very simple method of measuring velocities, has, however, the defect that the intensity of the current which flows through the self-induction coil D becomes less and less as the intervals of time between the successive current interruptions become smaller, or, in other words, as the velocity to be measured increases. This defect may be obviated by the following arrangement: If the measuring instrument used be electromagnetic—that is, one which is not dependent alone upon the intensity of the current, (hot-wire instrument and the like,) but is also influenced by the number of ampere-turns of the coil—it is possible by the application of two differential windings $e'$ and $e^2$, Fig. 2, to cause the number of ampere-turns to increase as the velocity to be measured increases. It is then only necessary to connect one of the windings of the instrument to the source of electricity, while the other winding is fed by the current that passes through the switch and the self-induction coil. As now a constant number of ampere-turns act in conjunction with a number of ampere-turns decreasing as the speed increases and acting in the reverse direction, it is possible by suitably proportioning the windings to obtain any required increase in the total number of ampere-turns. This arrangement has also the advantage that it depends less upon the fluctuations of the direct current used for measuring than does the device first described and illustrated in Fig. 1. It is obvious that if the electromotive force of the direct current employed for the measuring presents fluctuations of ten per cent. the pointer of the instrument will also record fluctuations of ten per cent., whereas in this second arrangement, Fig. 2, the fluctuation recorded by the measuring instrument is considerably smaller, for both windings undergo equal fluctuations and the error is compensated for, or partly so. The second arrangement gives, therefore, more accurate measurements.

The hereinbefore-described circuit arrangement may also be so altered that the direct current is not only interrupted, but also reversed. By this means the action of the self-induction is increased and a smaller self-induction coil may be used for the same purpose.

Fig. 3 illustrates a reverser, which is arranged with two contact-surfaces F and G, insulated from each other, and which may be used in place of the segments B and C when it is desired to reverse the current; and Fig. 4, the suitable connection.

If a second coil J be arranged below or adjacent to the self-induction coil D, inductive effects similar to those which take place in the self-induction coil D will be developed in the second coil J, and a modification of this invention consists in measuring the electromotive force induced in the second coil J. Figs. 5 and 6 illustrate correspondingly to the Figs. 1 and 4 two connections which can be used. On the breaking of a circuit having self-induction a spark is produced at the contacts, and this spark may in some cases be so strong that the contacts become damaged. In the case of the aforesaid tachometers the consequence of this would be that on the speed increasing the times of closing and breaking would when the apparatus has been a certain time in use be altered or varied, and this would render the indications of the apparatus inexact and give inaccurate measurements of the velocity, in consequence of which the apparatus would have to be frequently restandardized or the contacts renewed. The sparking at the contacts can be reduced to such a small extent that it becomes harmless, or it may be entirely avoided by the switching in a resistance parallel with the gap in the circuit. The current forming the spark does not then flow through the air between the two contacts, but flows through the resistance parallel with the gap in the circuit. The oscillation of the pointer of the measuring instrument is lessened; but it can be brought back to its original extent, or, at least in some measure increased by winding the resistance P, Figs. 7 and 8, on the self-induction choking-coil D. The amplitude of the pointer may be further increased by this means. A great improvement in the measurement of the electromotive force of the secondary circuit thus formed by the second coil is effected by switching in a resistance W, Fig. 9, in the primary circuit, this rendering the reading of the measuring instrument included in the secondary circuit more dependent upon the velocity than if no resistance were inserted. The switching in of a resistance permits of the tachometer being further improved. In many cases it is desirable that a correction of the readings taken should be made in the instrument itself, this being especially the case when the moving body does not effect the breaking of the circuits directly but through the medium of an intermediate member. If, for instance, the tachometer be mounted on a locomotive, it will be necessary to make a connection to take into account on the wear of the tires of the wheels. This correction might be effected by making the number of coils of the self-induction coil variable in the same manner as is done in transformers—*i. e.*, by so arranging the coils that some of them or groups of them may be switched out; but this method is in many respects difficult of execution. By the use of the aforesaid resistance this correction may be effected in a much simpler manner, for the resistance switched in the primary circuit affecting the oscillation of the pointer of the instrument switched in the secondary circuit, the compensation may be effected by rendering the resistance W included in the primary circuit, variable in the same manner as is done for regulating resistance, Fig. 10.

I claim—

1. In a velocity-meter, the combination with an electric circuit, of a circuit-varying device included in the circuit and adapted to move in any definite ratio to the movements of the body the movements of which are to be measured, a self-induction device included in the circuit, and an electromagnetic measuring instrument operatively associated with the circuit, substantially as described.

2. In a velocity-meter, the combination with an electric circuit, of a circuit-varying device included in the circuit and adapted to move in any definite ratio to the movements of the body the movements of which are to be measured, a self-induction device one coil of which is included in said circuit, and an electromagnetic measuring device connected in circuit with a second coil of the self-induction device, substantially as described.

3. In a velocity-meter, the combination with an electric circuit, of a circuit-varying device included in the circuit and adapted to move in any definite ratio to the movements of the body the movements of which are to be measured, a self-induction device included in the circuit, a resistance also included in the circuit, and an electromagnetic measuring instrument operatively associated with the circuit, substantially as described.

4. In a velocity-meter, the combination with an electric circuit, of a circuit-varying device included in the circuit and adapted to move in any definite ratio to the movements of the body the movements of which are to be measured, a self-induction device included in the circuit, an adjustable resistance also included in the circuit, and an electromagnetic measuring instrument operatively associated with the circuit.

In testimony whereof I have signed my name to this specification in the presence of two subscribing witnesses.

GEORG DETTMAR.

Witnesses:
FRANZ HASSLACHER,
ERWIN PEPPETY.